Dec. 19, 1939.   G. LINGG   2,183,685
CURRENT RESPONSIVE APPARATUS
Filed Jan. 8, 1938
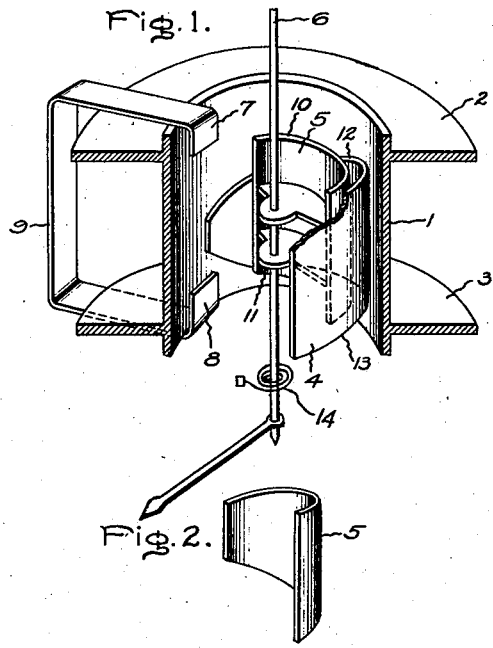
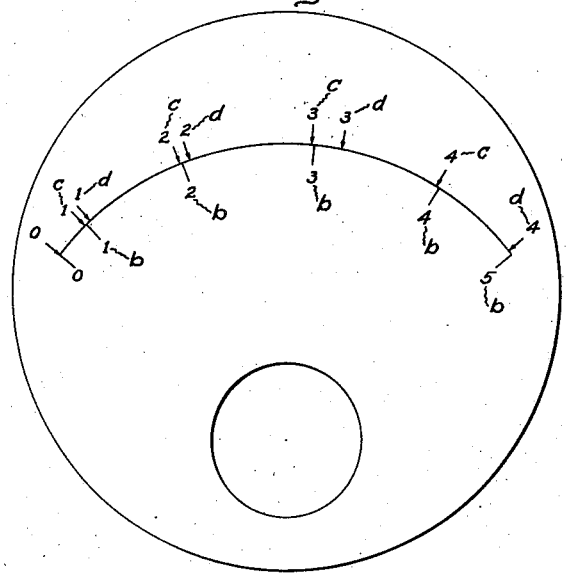
Inventor:
Gustav Lingg,
by Harry E. Dunham
His Attorney.

Patented Dec. 19, 1939

2,183,685

UNITED STATES PATENT OFFICE 2,183,685

CURRENT RESPONSIVE APPARATUS

Gustav Lingg, Berlin, Germany, assignor to General Electric Company, a corporation of New York Application January 8, 1938, Serial No. 184,079
In Germany January 11, 1937

2 Claims. (Cl. 171—95)

My invention relates to current responsive apparatus and concerns particularly electrical measuring instruments of the moving vane type.

It is an object of my invention to provide an improved form of current responsive instrument simply and ruggedly constructed and having a substantially uniform scale.

It is an object of my invention particularly to obtain an open scale in the upper portion of the range of the instrument.

In carrying out my invention in its preferred form I provide a current conducting coil with a substantially cylindrical opening therein, a stationary iron extending circumferentially along the inner surface of the coil and tapering to a minimum width at the upscale end, and a movable vane having an axis of rotation substantially coaxial with the coil and traveling along the surface of the stationary iron. For expanding the upper end of the scale I provide one or more auxiliary irons or attraction irons adjustably mounted in the vicinity of the upscale end of the path of the movable vane and extending from outside the coil into the internal space of the coil.

The invention will be understood more readily from the following detailed description when considered in connection with the accompanying drawing and those features of the invention which are believed to be novel and patentable will be pointed out in the claims appended hereto. In the drawing Figure 1 is a diagrammatic perspective view partially in section illustrating one embodiment of my invention. Figure 2 is a perspective view of a modified form of movable vane for use with the apparatus of Figure 1, particularly, when the main stationary iron of Figure 1 is omitted, and Figure 3 is a diagram illustrating the effect of my invention on the scale distribution of a moving vane type of instrument.

In electrical instruments of the moving vane or induction type, the torque depends upon the rate of change with respect to angular deflection of the magnetic flux flowing through the magnetizable members. In order to obtain a substantially uniform scale distribution, particularly in order to open up the scale at the upper end where it is ordinarily crowded in induction instruments of the usual type, I use a field construction in which the rate of change of magnetization is made more nearly uniform. The manner in which this is accomplished proceeds from the following consideration: The magnetic effect or the energy in a magnetic system is equal to the product of the total field strength of the coil and the induction in the magnetizable members at each instant. This magnetic energy may be ascertained by integrating the product of the field strength and the differential of the induction throughout the volume in question. If the magnetic energy is denoted by $W_m$, the field strength by $H$ and the induction by $B$, then for a space of volume $V$ in which magnetic flux is induced:

$$W_m = \int_V H dB$$

The magnetic energy may be considered separately in three portions of the space containing flux, first that in the iron of the system, second that inside the coil, and third that outside of the coil. Then if the subscripts 1, 2 and 3 are used to distinguish quantities in these three portions of the space containing flux, $$W_m = \int_{V_1} H_1 dB_1 + \int_{V_2} H_2 dB_2 + \int_{V_3} H_3 dB_3$$

The moment $M$ exerted on the rotating iron with a change of the angle of deflection $\phi$ is the derivative of magnetic energy with respect to angular deflection, which may be expressed by the equation:

$$M = \frac{dW_m}{d\phi} = \frac{d}{d\phi}\left[\int_{V_1} H_1 dB_1 + \int_{V_2} H_2 dB_2 + \int_{V_3} H_3 dB_3\right]$$

The magnetic energy outside the coil has no effect and can therefore be completely neglected. Moreover as the magnetic energy in the iron is considerably smaller than in the inside of the coil, practically only the value $$\frac{d}{d\phi}\int_{V_2} H_2 dB_2$$

contributes to the formation of the moment, which corresponds to the magnetic energy within the coil.

If the crowding together of the graduations at the ends of the scale is to be avoided, it is necessary that the rate of change of energy with change of the angle of deflection, be not essentially altered as the movable element deflects. Thus in approaching full deflection, it is necessary that such rate of change of magnetic energy with angle of deflection be only inconsiderably smaller, or even greater than at the beginning of the deflection. The formation of the magnitude $H_2 dB_2$ depends essentially on the magnitude of the induction, which is particularly strong in the vicinity of the iron. Thus if one or more additional irons, which can fully or nearly fully replace the fixed iron in their action, are placed approximately at the point where the rotating iron reaches its full deflection, then the moment exerted on the rotating iron upon approaching full deflection will be considerably greater than could hitherto be obtained with the ordinary rotating iron apparatus. In particular the arrangement is made so that the magnitude of the moment exerted remains constant as far as possible in order to produce as nearly uniform as possible a scale.

In Figure 1, the principle of the invention is illustrated by a diagram in which the relative positions of the parts are shown, but unimportant units or those not directly involved in the novel principle of the invention are omitted. The actual current conducting winding or coil is likewise omitted since its position is clear from the representation of the spool-shaped winding form consisting of a cylinder 1 and flanges 2 and 3. The magnetic axis of the coil is the mechanical axis of the cylinder 1. A sheet of magnetizable material 4 is mounted within the cylinder 1 and extends circumferentially, lying conveniently against the inner surface of the cylinder 1. The sheet 4 may be composed of soft iron or other suitable magnetizable material. This, for the sake of convenience, is referred to as a stationary iron although the invention is not limited to the use of iron.

A movable vane 5 is provided which preferably also is formed as a portion of a surface of a cylinder and is mounted upon a shaft 6 pivotally supported with an axis substantially parallel and if desired, coincidental with the mechanical axis of the cylinder 1. The vane 5 is likewise composed of any suitable magnetizable material such as soft iron, for example, and its path lies along the surface of the stationary iron 4 which is either tapered in the upscale direction or is otherwise so shaped that the distances between the pole portions of the vane 5 and the polarized edges of the stationary iron 4 decrease as the vane 5 moves in the upscale direction. A biasing spring 14 or other suitable means is provided for restraining the vane 5 against movement in the upscale direction.

At a position near the upscale end of the stationary iron 4 one or more auxiliary or attraction irons 7 and 8 are mounted so as to be adjustable in position. The irons 7 and 8 may be composed of soft iron or any other suitable magnetizable material and are so shaped as to extend into the internal space of the coil surrounding the cylinder 1. If desired, the irons 7 and 8 may be joined at their outer ends by a yoke portion 9. In the arrangement shown, the friction between the ends of the cylinder 1 and the irons 7 and 8, holds the member 7—8—9 but permits angular adjustment.

In the description and claims, I have used the term "iron" to refer generically to a member composed of any readily magnetized material.

The operation of the instrument will be apparent from the following considerations. It will be understood that the current conducting coil produces a magnetic field extending parallel to the shaft 6 so that the irons 4 and 5 are magnetized and magnetic poles are produced at the edges 10 and 11 of the movable iron or vane 5 and at the edges 12 and 13 of the stationary iron 4. Adjacent edges of the irons 4 and 5 have like polarity causing repulsion between the relatively movable irons 4 and 5.

Owing to the tapering of the edges 12 and 13 of the stationary iron 4, the distances between adjacent edges of the irons 4 and 5 increase as the iron 5 moves toward the left or the upscale direction and the repulsive forces, therefore, drive the iron 5 upscale. Since, as the vane 5 moves upscale, the distances between adjacent polarized edges become progressively greater, the available torque for overcoming the restraining-spring torque becomes less and less, and the upper portion of the scale of the instrument would tend to be quite crowded. However, the presence of the attraction irons 7 and 8 at the upscale end of the path of the movable vane 5 introduces an attractive force, since the irons 7 and 8 are magnetized by the field in such a manner as to have polarities opposite to the polarities of the adjacent poles of the movable vane 5. This attractive force becomes greater as the vane 5 approaches the full-scale position thereby expanding the upper portion of the scale so as to produce a substantially uniform scale. It will be understood that for the purpose of adjusting the exact shape of the scale and varying the calibration, the attraction irons 7 and 8 are adjusted in any suitable manner to vary their angular position on the cylinder 1.

The scale shown in Figure 3 illustrates the effect of the attraction irons 7 and 8. The lower set of scale markings and numerals marked $b$ represents the calibration of a repulsion instrument of customary construction not having the attraction irons 7 and 8. If the attraction irons 7 and 8 are mounted at the zero position of the movable element 5, a different set of calibrations marked $c$ is obtained which differs, however, relatively little from that of the calibration $b$. By mounting the attraction irons 7 and 8 at the full-scale position of the movable vane 5, as hereinbefore described, a set of calibrations $d$ is obtained. It will be seen that the attraction irons 7 and 8 have relatively little effect on the lower half of the scale. Even the halfscale position is nearly unaffected. However, the upper portion of the scale is considerably expanded as will be seen from the fact that four units of current produce very nearly the same deflection on scale $d$ as five units of current on scale $b$. The criterion of the effectiveness of the upper scale compensation is the distance between the three and four ampere calibrations marked $d$ as compared with the difference from the three and four ampere calibrations marked $c$. It will be seen that the instrument has been made very much more sensitive in the upper portion of the scale.

If the movable vane 5 is also tapered in the upscale direction, the amount of attraction between the movable vane 5 and the attraction irons 7 and 8 increases as the fullscale position is approached. This effect may be utilized instead of the variation in repulsion between the vane 5 and the stationary iron 4 for producing deflection of the movable element and if desired, the stationary iron 4 may be omitted when a movable-vane shape as shown in Figure 2 is employed.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A current responsive device comprising a current conducting coil having an opening therein extending substantially parallel with the magnetic axis of said coil, a stationary sheet of magnetizable material within said opening bent substantially along the surface of a cylinder having an axis parallel with the magnetic axis of the coil and tapering in a given direction referred to as the upscale direction, a movable vane of magnetizable material rotatably mounted to travel in proximity to the surface of said stationary sheet and an auxiliary member of magnetizable material extending into the opening in said coil and adjustably mounted at the upscale end of the stationary sheet.

2. A current responsive instrument comprising a current conducting coil, a movably mounted vane of magnetizable material in inductive relation to said coil and tapering in the upscale direction, an attraction iron extending into said coil mounted at the upscale end of the path of said vane and means for resiliently opposing movement of said vane in the upscale direction.

GUSTAV LINGG.